July 21, 1942.     C. R. ECKERT     2,290,741
IMPREGNATED FIBERBOARD
Filed March 3, 1938
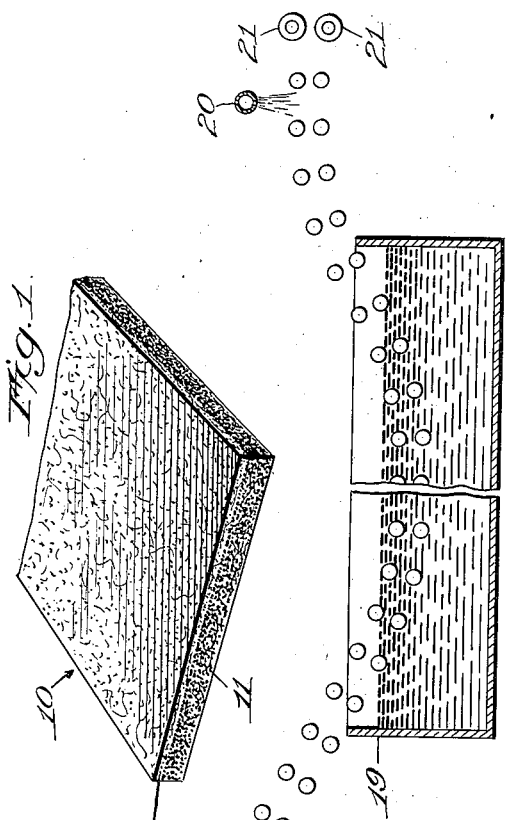
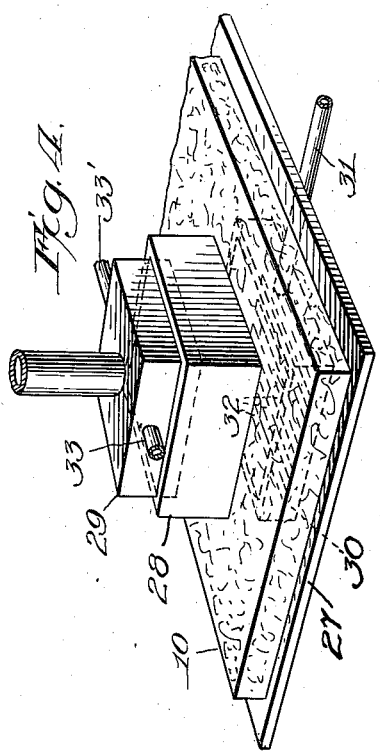
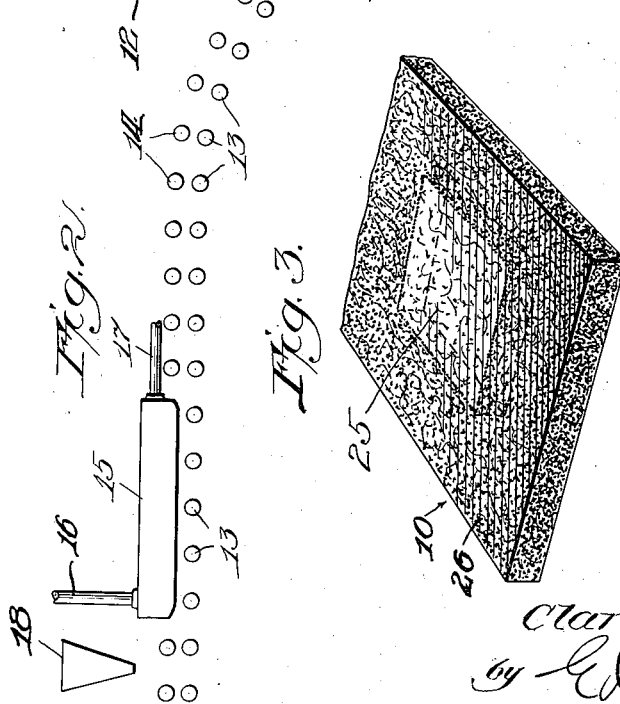
Inventor:
Clarence R. Eckert.
by Edw. A. Hampson
Atty.

Patented July 21, 1942

2,290,741

UNITED STATES PATENT OFFICE 2,290,741

IMPREGNATED FIBERBOARD

Clarence R. Eckert, Englewood, N. J., assignor to The Celotex Corporation, Chicago, Ill., a corporation of Delaware Application March 3, 1938, Serial No. 193,718

6 Claims. (Cl. 117—68)

In the past it has been more or less common to saturate various fibrous products, such as fiber insulation board, with various asphalts, waxes, resins, and the like in order that the such so saturated fiber board products might be particularly adaptable for certain uses. Insofar as is known in the past, all of the such saturated fiber board products have had substantially uniform impregnation either complete or partial and so far as is known heretofore, no attempt has been made to bring about the impregnation of such materials in a manner so as to deliberately produce a such product having a portion thereof impregnated with a material of one hardness and a further portion thereof impregnated with a material of a differing hardness.

In the above reference to the impregnation of a fiber board product with substances of different hardness in different portions thereof, reference is meant to be made to impregnation through the thickness of the such material as distinguished from the impregnation of a portion of the area thereof, but while different impregnations through the thickness of the fiber board product are particularly referred to in connection with the invention hereof, it is to be understood that the invention is applicable to provide different impregnation of different areas of fiber board materials.

In certain uses of impregnated fiber board products, as for example in the use of such for floor surfacing materials, it is advantageous to have a portion thereof impregnated with a relatively soft or yielding material and to have another portion thereof impregnated with a relatively hard and unyielding material whereby the hard and unyielding impregnated portion surface provides a durable wearing surface, and the portion which is impregnated with the relatively soft and yielding substance serves as a cushion for the relatively hard and unyielding wearing surface portion.

It is an object of this invention to produce a fiber board product which is impregnated differentially, that is wherein portions thereof are impregnated with a relatively soft and yielding substance and other portions thereof are impregnated with relatively hard and unyielding substances.

A further object of the invention is the development of the process of producing the composite product as above described and still other and further objects of the invention will become apparent on reading the following specification when taken in connection with the accompanying drawing.

In the accompanying drawing:

Figure 1 is a perspective of an impregnated fiber board produced in accordance with the invention hereof;

Figure 2 shows diagrammatically a means for carrying out the process of the invention;

Figure 3 is a perspective of an impregnated fiber board in which different areas are impregnated with different materials as distinguished from such product in which the different impregnations are of different portions through the thickness of the board; and Figure 4 is a diagrammatic view of the means for carrying out the impregnation illustrated in Figure 3.

In Figure 1 there is illustrated an impregnated fiber insulation board indicated generally by the numeral 10 and in which the lower portion 11 is impregnated with a relatively soft and yielding substance, whereas the upper portion 12 thereof is impregnated with a relatively hard and unyielding substance. Preferably, the fiber insulating board 10 is a sheet of fiber board ordinarily manufactured and sold as fiber insulating board, that is a relatively open and porous board formed of relatively large fibers and characterized by a weight of approximately ⅔ lb. per sq. ft. per ½ inch of thickness with a conductivity of approximately 0.33 B. T. U. The lower or yielding portion of the fiber board 10 may be impregnated as at 11 with a relatively low melting point asphalt or relatively low melting point wax, or resin, pitch or gum, or other more or less generally similar impregnating substance as distinguishing from the upper or relatively hard and unyielding portion 12 which may be impregnated with a high melting point asphalt, gilsonite, a high melting point wax, resin, pitch, or gum, or generally similar relatively hard and unyielding material.

A method of impregnating a fiber board in accordance with that portion of the invention hereof illustrated in Figure 1, that is in connection with the preparation of a saturated fiber board wherein one portion of the thickness is impregnated with a material of certain characteristics and the remainder of the thickness is impregnated with a material of different characteristics, is diagrammatically illustrated in Figure 2.

In Figure 2 there is provided a suitable conveyor system which for the purposes of illustration is indicated as a series of conveyor rolls 13 with which cooperate a series of top guide rolls 14, all of which rolls or any suitable portion thereof may be appropriately driven in order that the sheet of fiber board may be carried through the apparatus to be subjected in its travel to the various steps of treatment which will result in the desired finished product. Over a portion of the conveyor rolls 13 there is provided what will be termed an iron 15 which is a hollow metal box having if desired appropriate directing channels therein to cause a fluid circulated therethrough to take a tortuous path and which iron is heated by a circulating fluid medium flowing into and out from the respective connections 16 and 17 of the iron.

It is to be understood that the heating fluid which is circulated through the iron 15 may be any suitable fluid of the required temperature and having such specific heat that the volume thereof which can be passed through the iron will provide the required amount of heat to accomplish the desired results. As an example of heating medium which may be used, there are suggested as practical high melting point asphalts, oils, mercury, or mercury vapor, or other like or similar fluid which when in highly heated condition at about 500° F. preferably may be circulated to provide the required heat. It is of course to be understood that the iron 15 is suitably positioned with respect to the conveyor 13 so that it will suitably bear upon the upper surface of a board 11 when it is passed through the apparatus.

In the direction, located just ahead of the iron 15, when considered in the light of the motion of material through the apparatus, there is a distributor 18 which is adapted to apply to the surface of the board 10 a suitable saturant material, which saturant is applied just prior to the passage of the sheet 10 under the iron 15. In this first phase of the treatment of the board as has just been described, there is applied to a surface of the board and to a predetermined depth a substance such as a high melting point asphalt or the like which is ironed into the surface or driven thereinto by the action of the hot iron as the board 10 carrying on its surface the such treating substance passes under the heated iron 15.

As the second stage in the operation of the apparatus the board 10 which emerges from under the iron 15 proceeds on the conveyor 13 to be carried into a suitable tank 19 or the like containing therein the second saturant which is designed to saturate the remainder of the board 10 not theretofore saturated by the treatment under the iron 15. The board is carried under the surface of the saturant which is contained in a tank 19 and which may be suitably heated if required and is then carried up out of the saturant and may continue on the conveyor to pass under a water shower 20 and finally between squeeze or squeegee rolls. The water shower 20 serves to somewhat cool the board at this stage of its production and squeegee rolls 21 serve to remove any excess water from the surface of the product before it is taken away for storage.

As an example of the surface saturation which may be accomplished under iron 15 and if a relatively hard surface is desired, petroleum pressure pitch may be used, or gilsonite, or an equivalent petroleum residual asphalt may be used, or other like or similar saturant with relatively high melting point, say 185°—400° M. P. (A. S. T. M. ring and ball method), may be employed in this stage of the process. The high melting point saturant may be applied to the surface of the board 10 by the distributor 18 either in the form of powder or as a liquid if there is provided suitable means for heating and conveying the such liquefied saturant to the distributor member 18. The coating of high temperature saturant applied to the surface of the board as just described will be driven into the upper portion of the board 10, as at 12, as the board is carried through the apparatus under the hot iron 15.

For saturating the remainder of the board, that is the portion indicated by the numeral 11 with the relatively low temperature saturant, there may be used low melting point petroleum pressure pitch of say 120° M. P. ring and ball method of test, or the equivalent residual asphalt, or coal tar, or suitable blends or combinations thereof providing a saturant having approximately the fluidity of 40 sec. Furol viscosity for 60 c. c. at a reasonable temperature say at around 350° F., a temperature at which the saturant in the upper portion 12 of the board does not become similarly fluid.

It is of course understood that depending somewhat upon the temperature and fluidity of the saturant at such temperature that the iron 15 is of proper length so that the saturant applied at the distributor 18 will be suitably driven into the surface of the board and that the period of submergence of the board in the saturant in the tank 19 is such that there is time allowed for the saturation of the lower part of the board with the low temperature saturant material.

In applying this invention to the saturation of areas of a board 10 as distinguished from the differential saturation of different portions through the thickness, an apparatus differing from that hereinbefore described will be used and to saturate a portion 25 of a board with a relatively hard saturant as distinguishing from the saturation of the remainder of the board 26 with a relatively soft saturant, there may be used an apparatus such as is illustrated in Figure 4.

In Figure 4 there is illustrated a suitable table 27 on which may be placed a board 10, a portion of the area of which is to be saturated with a relatively hard saturant. There may be then brought down on the upper surface of the board 10 a box-like structure 28 which is of the size of the area which is to be impregnated with the relatively hard saturant. This box-like structure 28 is open on the bottom so that the saturant when admitted to this open bottom box will be applied to the upper surface of the board 10 over the portion which is to be saturated. A tight fitting plunger 29 may operate through the open top of the box-like structure 28 and be suitably forced down against the upper surface of the sheet 10 to force thereinto and therethrough suitable saturant which may have been admitted into the box-like member 28. Of course it is not necessary that plunger 29 be used to force the saturant into the board, but instead the box-like structure 28 may have a closed top and a high pressure may be applied to the saturant which has been admitted into the box-like structure 28 by suitably introducing for example a gaseous fluid thereinto under high pressure to consequently force the saturant into the board 10. A heating medium may be circulated through inlet and outlet pipes 33 and 33' respectively in plunger 29 if additional heat is required during the saturating period.

In addition to the provision for forcing the saturant into the board from the upper surface as has been described, there may be provided on the underside of the table member 27 a suction box such as 30 which may be connected to a suitable source of suction or vacuum, as by pipe 31. The table is provided with suitable slots or openings 32 in that portion thereof over the suction box 30 and the use of such suction box 30 will assist in drawing the saturant through the thickness of the board 10, a portion of which is being saturated.

After the relatively hard and unyielding saturant has been driven through the thickness of a portion of the area as just above described, the such treated board may be then passed through the secondary saturating stage of the complete process of treatment, as was above first described herein, to be saturated throughout the remainder of its body with the desired relatively soft and yielding saturant and it may then be cooled and squeegeed as was described.

It is to be understood that the specific saturants and method of saturation as hereinabove described, are intended to be illustrative of the invention and that in the light thereof those skilled in the arts appertaining thereto may readily perceive other procedures for bringing about the desired results in connection with the saturation and may readily substitute other and different saturants either singly or in combination for those which have been specifically mentioned. It is of course immediately apparent that for the relatively hard and unyielding saturant there may be used a wax of high melting point and for the saturation with a relatively soft and yielding saturant there may be used a relatively low melting point wax. It is also apparent that various heat hardening resins may be employed or thermo setting resins may be employed and that in fact there are many and various substances which may be used for the saturation in lieu of those specifically mentioned. The essentials of the saturation processes are that the first saturation is with a substance which will not be adversely affected by the treatment comprising the second or final saturation. As an example of a further modification of the process a portion of the sheet may be saturated with a resin such as that of the phenol formaldehyde type dissolved in a suitable solvent and the remainder of the sheet then saturated with the same or a different resin in a suitable solvent which will not cause the original application of resin to be redissolved, as for example if the first application of resin has been caused to polymerize by suitable application of heat between the steps of the process, the solvent used in the second step of the saturation will not cause the polymerized portion of the resin to redissolve and of course if resins are used with solvents respectively not solvents for the other resin used, it is readily understood after the solvent used in the first step of the process has been driven off that the second saturation of the process will not adversely affect the first stage of the saturation. As a specific example of different wax which may be used, there may be used montan wax for the high melting point saturation and low melting paraffin for the second phase of the process. As hereinbefore mentioned in view of the description which has been given, those skilled in the arts appertaining hereto may readily devise various combinations of the various substances mentioned and of like and/or similar substances which may be used in like manner for the differential saturation, as has been herein described.

What I claim is:

1. A felted fiber board form sheet comprising a wearing surface and a yielding surface and having a portion thereof from a surface and extending inwardly therefrom, saturated with a high melting point petroleum pressure pitch whereby the wearing surface is formed, with the remaining portion thereof saturated with a petroleum pressure pitch of a lower melting point whereby the yielding surface for the wearing surface is formed.

2. A felted fiber board comprising surfaces of varying degrees of hardness, a surface thereof, together with an adjacent portion, saturated with a saturant, the remainder of the sheet saturated with another saturant, the one saturant being harder than the other saturant, and softening to a lesser extent as the temperature to which such saturants may be subjected increases above a temperature of about 65° F. whereby a substantially hard wearing surface is formed.

3. A felted fiber board comprising a wearing surface and a yielding surface, a portion of the thickness thereof saturated with a substance of that class represented by 185°–400° M. P. (A. S. T. M. ring and ball method) petroleum pressure pitch, oil and coal tar pitch of equivalent hardness, and gilsonite, forming a wearing surface and the remainder of the board saturated with that class of substance represented by petroleum pressure pitch of 120 M. P. (A. S. T. M. ring and ball method), and oil and coal tar pitch of similar hardness forming a yielding surface.

4. A felted fiber board form sheet, comprising a wearing surface and a yielding surface and having a portion thereof, from a surface and extending inwardly therefrom, saturated with a waxy material of high melting point whereby the wearing surface is formed, the remaining portion thereof saturated with a waxy material of a melting point lower than the melting point of the aforesaid waxy material whereby the yielding surface is formed.

5. A felted fiber board form sheet, comprising a wearing surface and a yielding surface and having a portion thereof, from a surface and extending inwardly therefrom, saturated with montan wax whereby the wearing surface is formed, the remaining portion thereof saturated with paraffin wax of a melting point lower than the melting point of the aforesaid montan wax whereby the yielding surface is formed.

6. A felted fiber board comprising surfaces of varying degrees of hardness, a surface thereof, together with an adjacent portion saturated with a thermo-plastic resin saturant, the remainder of the sheet saturated with a different thermo-plastic resin saturant, the one resin being harder than the other resin and softening to a lesser extent as the temperature to which such saturants may be subjected increases above a temperature of about 65° F. whereby a substantially hard wearing surface is formed.

CLARENCE R. ECKERT.